L. A. LEECH.
FLYING MACHINE.
APPLICATION FILED FEB. 28, 1911.

1,028,120.

Patented June 4, 1912.
5 SHEETS—SHEET 1.

Witnesses
M. P. McKee
L. M. Gillespie

Inventor
L. A. Leech
Alex. J. Wedderburn, Jr.
Attorney

L. A. LEECH.
FLYING MACHINE.
APPLICATION FILED FEB. 28, 1911.

1,028,120.

Patented June 4, 1912.

5 SHEETS—SHEET 3.

Witnesses
M. P. McKee
B. M. Gillespie

Inventor
L. A. Leech
Alex. J. Wedderburn Jr.
Attorney

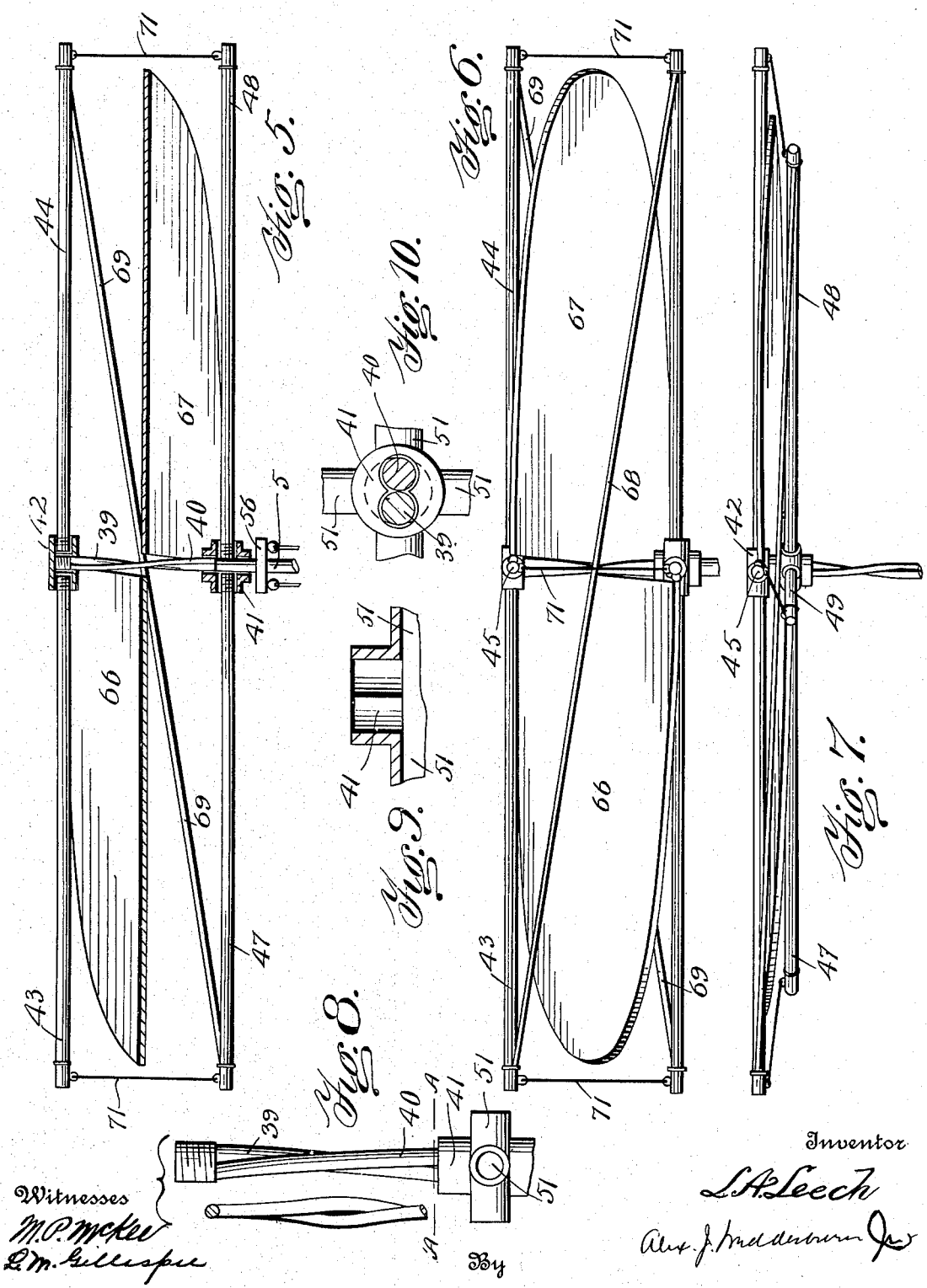

L. A. LEECH.
FLYING MACHINE.
APPLICATION FILED FEB. 28, 1911.
1,028,120.
Patented June 4, 1912.
5 SHEETS—SHEET 5.
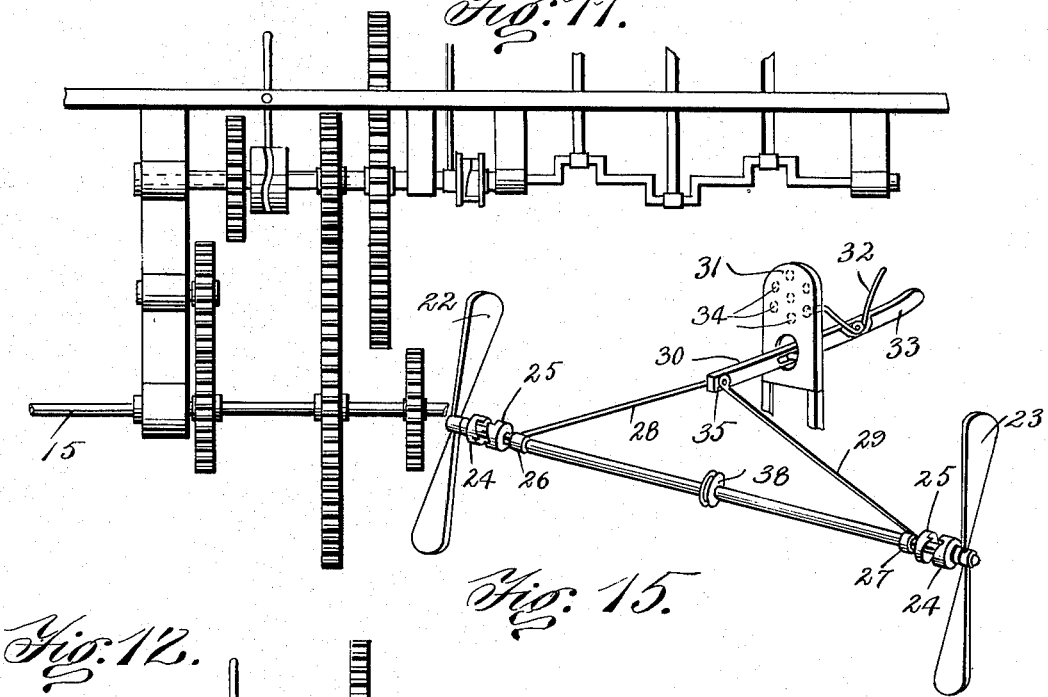
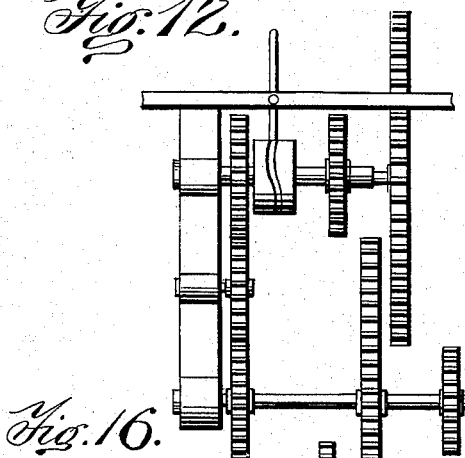
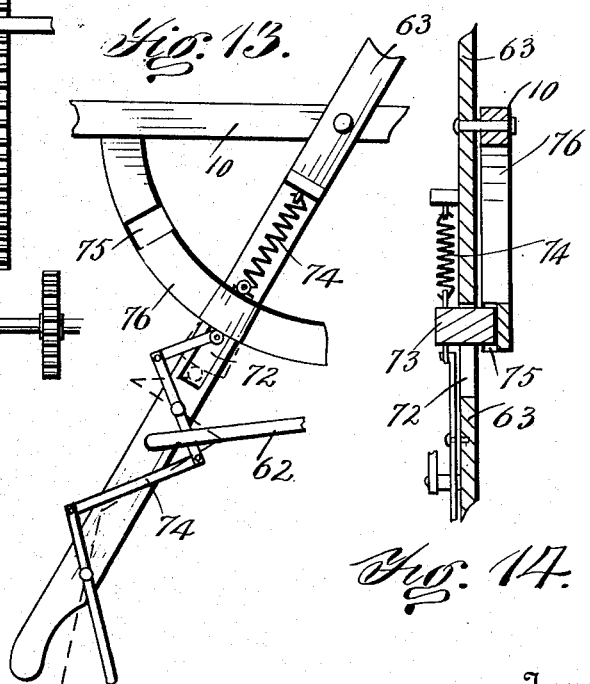
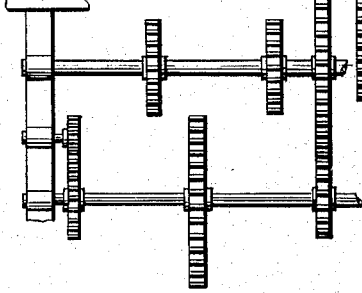
Witnesses
M. P. McKee
L. M. Gillespie
Inventor
L. A. Leech
Attorney

UNITED STATES PATENT OFFICE.

LEOPOLD A. LEECH, OF CARNEGIE, PENNSYLVANIA.

FLYING-MACHINE.

1,028,120.　　　　　Specification of Letters Patent.　　Patented June 4, 1912.

Application filed February 28, 1911. Serial No. 611,357.

*To all whom it may concern:*

Be it known that I, LEOPOLD A. LEECH, citizen of the United States, residing at Carnegie, in the county of Allegheny and State of Pennsylvania, have invented certain new and useful Improvements in Flying-Machines, of which the following is a specification.

This invention relates to improvements in heavier than air flying machines and has for one of its objects to provide a machine of the helicopter type in which the planes or blades may be readily changed in their relation to one another by the operation of the machine whereby the machine may be caused to raise in its flight or travel in a horizontal direction.

Another object of the invention is to provide a machine of this character having propeller blades which also act as the steering mechanism.

With the above and other objects in view, I have invented the machine illustrated in the accompanying drawings in which—

Figure 1:
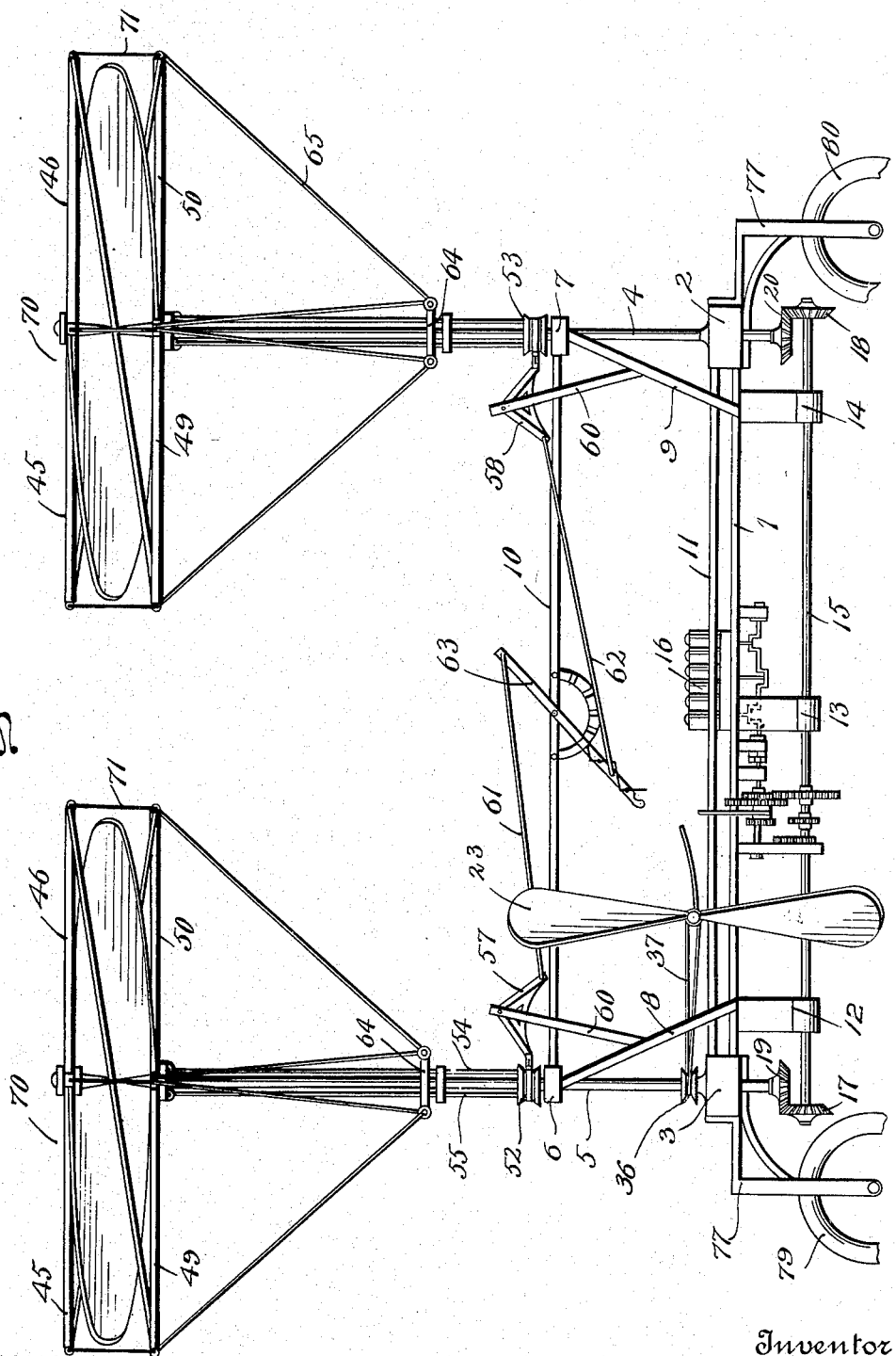
Figure 2:
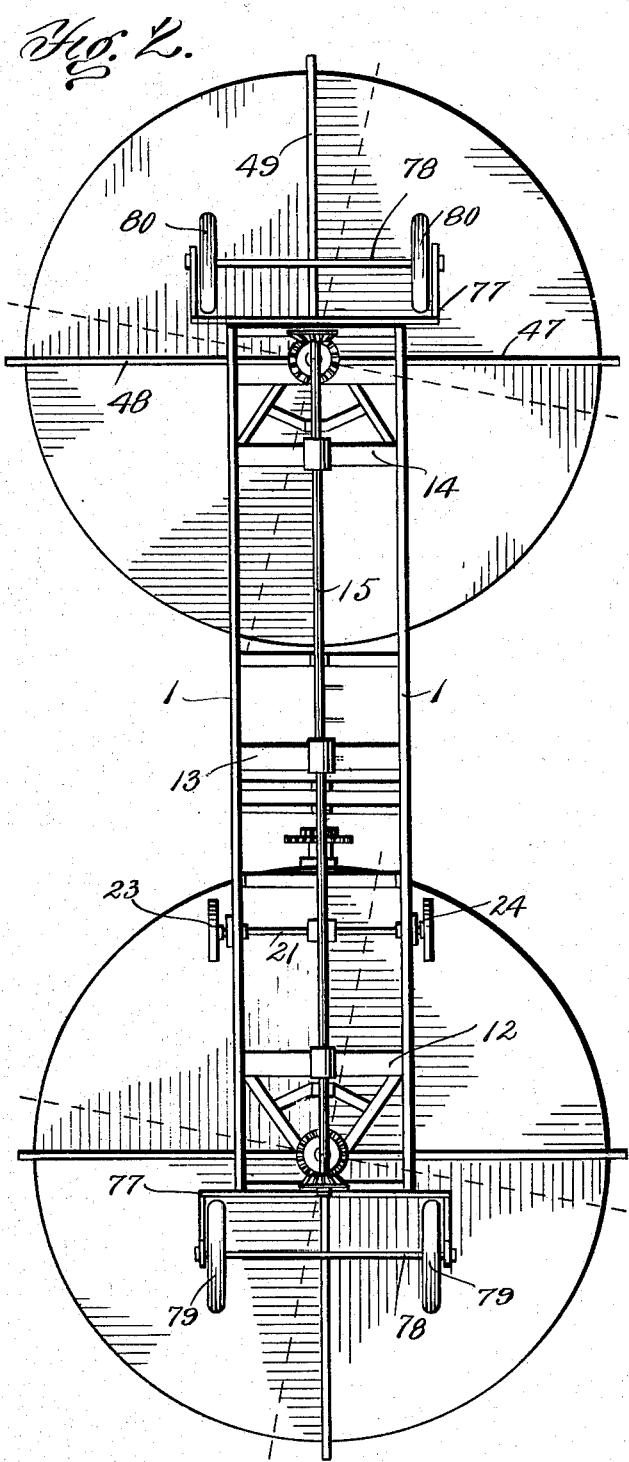
Figure 3:
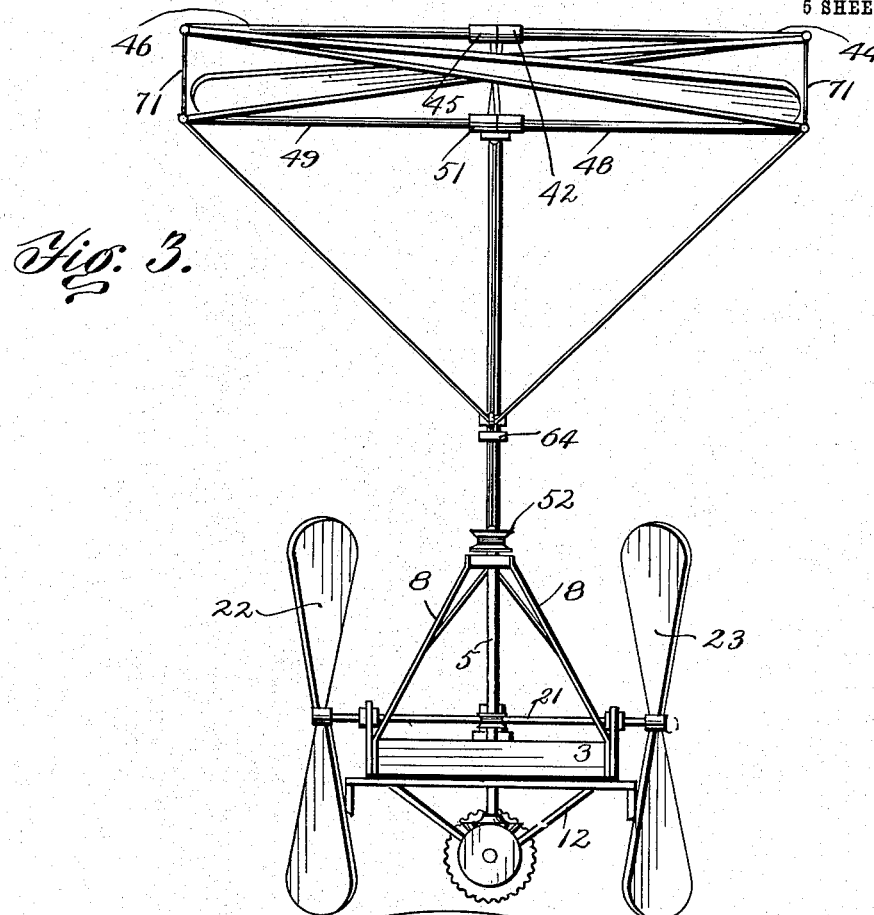
Figure 4:
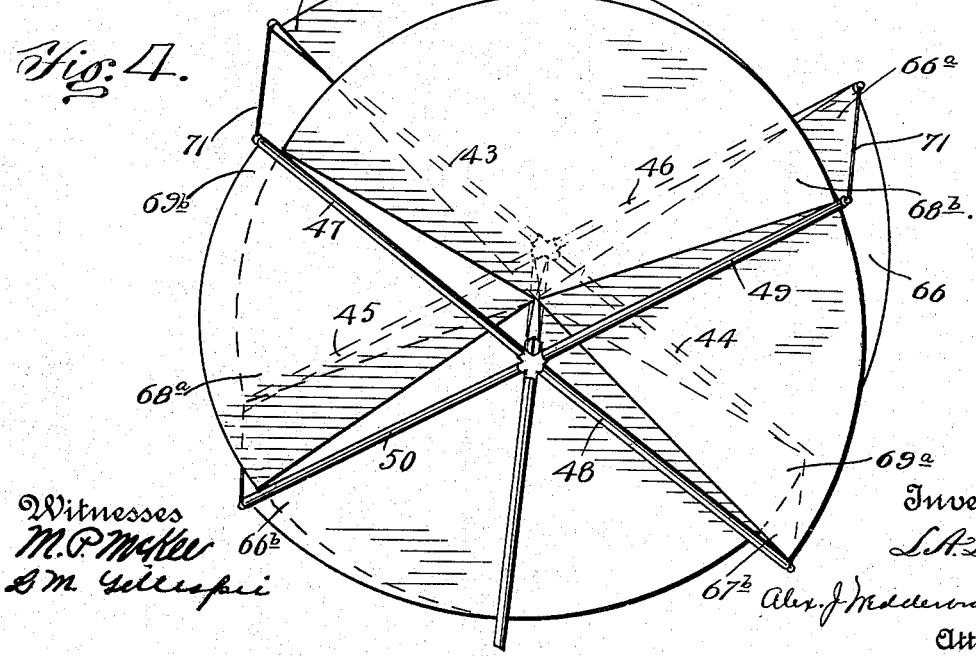

Figure 1 is a side elevation of a machine constructed according to my idea, Fig. 2 is a bottom plan view of the machine, Fig. 3 is an end elevation thereof, Fig. 4 is a detail perspective view of one of the helicopter propellers, Fig. 5 is an enlarged central vertical sectional view of one of the helicopter propellers in an extended position, Fig. 6 is an elevational view thereof, Fig. 7 is an elevational view thereof in a collapsed position, Fig. 8 shows enlarged details of a rotating means for connecting the frame members supporting the planes of said propeller, Fig. 9 is an enlarged fragmental detail vertical sectional view of a rotatable member and supporting means, Fig. 10 is a transverse sectional view taken on line A—A of Fig. 8, Fig. 11 is an enlarged detail view of a power transmission means, Fig. 12 is a fragmental view showing the gearing of Fig. 11 in a shifted position, Fig. 13 is an enlarged detail view of a shifting lever and locking bar therefor, Fig. 14 is a longitudinal sectional view through a portion of said lever and bar, and Fig. 15 is a detail perspective view of a shaft carrying propellers and a clutch operating means. Fig. 16 is a fragmental plan view of the gearing shifted to still another position.

Referring to the accompanying drawings 1 indicates a framework upon the opposite ends of which are mounted cross bars 2 and 3 in which are mounted the shafts 4 and 5 these shafts pass through the bars 6 and 7 which are supported by the bars 8 and 9. A horizontal rod 10 connects the bars 6 and 7 and horizontal stiffening rods 11 connect the bars 2 and 3. Hangers 12, 13 and 14 support the centrally disposed longitudinal drive shaft 15 which is driven by the engine 16 through the medium of the gears mounted on the shaft 15 and those that connect with the engine. On each end of the shaft 15 are bevel gears 17 and 18 which operate the bevel gears 19 and 20 on the ends of the vertical shafts 4 and 5.

Loosely mounted on the transverse shaft 21 are propeller baldes 22 and 23 which carry clutch connections 24 adapted to be engaged by the clutches 25 which are keyed to the shaft so that they are at all times rotatable therewith, yet longitudinally slidable thereon. Loosely mounted on the shaft are collars 26 and 27 which are connected by the rods 28 and 29 which are connected to a lever 30, pivotally supported by a member 31 to which said lever is fulcrumed and adapted to move vertically or horizontally and to be held in a fixed position by means of the spring controlled latch member 32, which is mounted on the handle 33 of the lever and is adapted to engage any of the openings 34 in the member 31.

By raising the handle 33 of the lever vertically, the end 35 will force the rods 28 and 29 to spread apart at their outer ends forcing the collars 26 and 27 against the clutch members 25 and forcing them into engagement with the members 24 fixed to the propellers 22 and 23, thus causing them to rotate with the shaft and drive the machine in a horizontal direction, but if the lever 30 is moved in a horizontal direction to the right or left just one of the propeller blades will be caused to rotate. By operating one of the propellers at a time the car may be steered in a desired direction. Mounted on the shaft 5 is a pulley 36 which operates a belt 37 connected with the pulley 38 on the shaft 21 whereby said shaft is operated.

The upper ends of the shafts 4 and 5 are divided and the parts 39 and 40 are twisted around one another and the collar 41 is so shaped that it will snugly fit around the members 39 and 40. When the collars are raised or lowered it will be forced to follow the course of the twisted members and thereby be caused to rotate. On the top of the members 39 and 40 is mounted a coupling 42 into which is screwed the supporting rods 43, 44, 45 and 46 which when in the position shown in Fig. 6 are directly over the rods 47, 48, 49 and 50, which are screwed into the coupling portion 51 of the collar 41.

Mounted on the shafts 4 and 5 are collars 52 and 53 which are connected by rigid rods 54 and 55 to plates 56 which are adapted to abut the members 41. Bell cranks 57 and 58 pivoted on supports 60 are connected to the collars 52 and 53 and to rods 61 and 62 which are connected to opposing ends of a lever 63 pivotally mounted on the rod 10. By shifting the lever 63 to a position opposite to that shown in Fig. 1 the rods 61 and 62 will shift the position of the bell cranks 57 and 58 causing them to force up the collars 52 and 53 on the shafts 4 and 5, which in turn will force the plates 56 up. These in their turn will force up the members 41 which in their upward movement will rotate causing the rods secured to this member to change their position relative to the rods connected by the members 42. Members 64 are fixed to the rods 55 and 54 and are adapted to secure the lower ends of the braces 65 which connect with the outer ends of the rods 47, 48, 49 and 50.

The rods 43 to 46 and 47 to 50 form a framework between which and connected to which, are a series of semi-circular blades 66, 67, 68 and 69, one corner of each of which is secured to the outer end of one of the rods in the upper blades and the other corner of each of which is connected to the outer end of one of the rods in the lower blades, so that when the lifting propellers 70 are in the positions shown in Figs. 1, 3, 4, 5 and 6 they assume the form of a screw by means of which when rapidly revolved the machine may be lifted up directly into the air. However, when a desired height is reached by shifting the lever 63 the lower blades are rotated and raised so that the propellers 70 will assume the form shown in Fig. 7, which is practically the form of a horizontal plane. The machine may then be driven ahead horizontally or allowed to gradually descend to the ground, as the members 70 when in this position act as parachutes. The opposing rods of the upper and lower sets of rods are connected at their outer ends by connecting rods 71. The lower set of rods cannot rotate a distance greater than the length of the rods 71.

In Fig. 4 the member 1 is shown in perspective so that it may be seen clearly how the various blades are connected to their supporting rods. The corner 66$^a$ of the blade 66 is secured to the end of the upper rod 46 and the corner 66$^b$ thereof is secured to the lower rod 50. The corner 67$^a$ of the blade 67 is secured to the upper rod 43 and the other corner 67$^b$ is secured to the lower rod 48. The corner 68$^a$ of blade 68 is secured to the upper rod 45 while its other corner 68$^b$ is secured to the lower rod 49. The corner 69$^a$ of blade 69 is secured to the upper rod 44 and its other corner 69$^b$ is secured to the lower rod 47.

In the lever 63 is a slot 72 in which is a stop 73 controlled by a spring and operating member 74 and adapted to engage the slots 75 in the arcuate stop member 76 by means of which the lever may be secured in a desired position. Secured to the frame 1 are axle bearing members 77 on which are journaled the axles 78 upon which are mounted the wheels 79 and 80.

I claim and desire to secure by Letters Patent,

1. In a flying machine, vertically mounted propellers, comprising four semi-circular blades, means for rotating same, said blades being angularly disposed, a frame consisting of upper and lower sets of rods for supporting said blades, said upper rods being connected to said lower rods by connecting rods, means for collapsing said blades, to form a horizontal plane.

2. In a flying machine, vertically mounted propellers, comprising four semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower set of rods to said upper set of rods.

3. In a flying machine, vertically mounted propellers, comprising four semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower set of rods to said upper set of rods, and means for rotating said lower set of rods as they are raised.

4. In a flying machine, vertically mounted propellers, comprising four semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower set of rods to said upper set of rods, means for bracing said sets of rods.

5. In a flying machine, vertically mounted propellers, comprising four semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower set of rods to said upper set of rods, means for bracing said sets of rods, a pair of transversely mounted propellers for horizontally steering said machine.

6. In a flying machine, vertically mounted propellers, comprising semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower set of rods to said upper set of rods, means for bracing said sets of rods, a pair of transversely mounted propellers for horizontally steering said machine, means for separately operating said horizontal propellers.

7. In a flying machine, vertically mounted propellers, comprising four semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower set of rods to said upper set of rods, means for bracing said sets of rods, a pair of transversely mounted propellers for horizontally steering said machine, means for separately operating said horizontal propellers, said means adapted to simultaneously operate both of said propellers.

8. In a flying machine, vertically mounted propellers, comprising semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower sets of rods to said upper sets of rods, a pair of transversely mounted propellers for horizontally steering said machine, a shaft for operating said horizontal propellers.

9. In a flying machine, vertically mounted propellers, comprising four semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower set of rods to said upper set of rods, means for bracing said sets of rods, a pair of transversely mounted propellers for horizontally steering said machine, a shaft for operating said horizontal propellers, said propellers being loosely mounted thereon.

10. In a flying machine, vertically mounted propellers comprising four semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower sets of rods to said upper sets of rods, a pair of transversely mounted propellers for horizontally steering said machine, a shaft for operating said horizontal propellers, said propellers being loosely mounted thereon, said means for operating said propellers consisting of individually operated clutches.

11. In a flying machine, vertically mounted propellers, comprising four semi-circular blades, means for rotating same, said blades being angularly disposed, a frame consisting of upper and lower sets of rods for supporting said blades, said upper rods being connected to said lower rods by means of connecting rods, means for collapsing said blades to form a horizontal plane, said means consisting of a device for raising said lower set of rods to said upper set of rods, a pair of transversely mounted propellers for horizontally steering said machine, a shaft for operating said horizontal propellers, said propellers being loosely mounted thereon, said means for operating said propellers consisting of individually operated clutches, means for simultaneously operating said clutches.

In testimony whereof I affix my signature in presence of two witnesses.

LEOPOLD A. LEECH.

Witnesses:
PETER L. DORNENBURG,
ANDY STRUZKA.